No. 655,323. Patented Aug. 7, 1900.
S. BELANGER.
GRAIN DRILL.
(Application filed Mar. 21, 1900.)
(No Model.) 2 Sheets—Sheet 1.

Witnesses Simon Belanger Inventor
By his Attorneys,

No. 655,323. Patented Aug. 7, 1900.
S. BELANGER.
GRAIN DRILL.
(Application filed Mar. 21, 1900.)
(No Model.) 2 Sheets—Sheet 2.
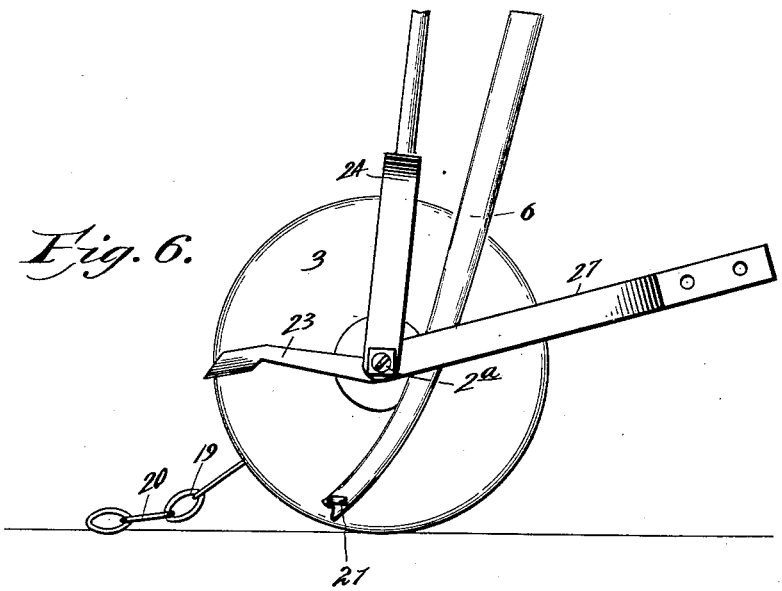
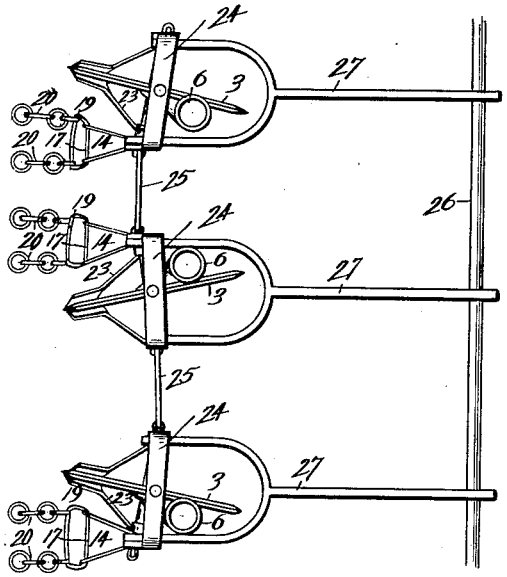
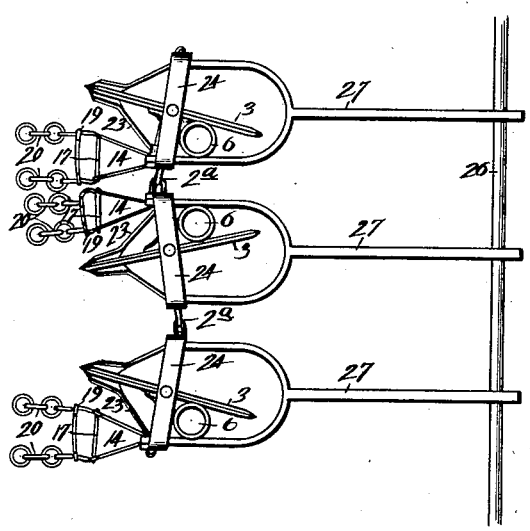
Witnesses  Simon Belanger Inventor
By his Attorneys,

UNITED STATES PATENT OFFICE.

SIMON BELANGER, OF ST. JEAN BAPTISTE, MANITOBA, CANADA.

GRAIN-DRILL.

SPECIFICATION forming part of Letters Patent No. 655,323, dated August 7, 1900.

Application filed March 21, 1900. Serial No. 9,581. (No model.)

*To all whom it may concern:*

Be it known that I, SIMON BELANGER, a subject of the Queen of Great Britain, residing at St. Jean Baptiste, in the Province of Manitoba and Dominion of Canada, have invented a new and useful Grain-Drill, of which the following is a specification.

The invention relates to improvements in grain-drills.

The object of the present invention is to improve the construction of grain-drills, more especially the means for mounting the seed-tube and the rotary colter or disk, and to provide a construction adapted to be applied to any style of grain-drill or planter and capable of effectually cleaning the disk or colter of the soil adhering to the same.

The invention consists in the construction and novel combination and arrangement of parts hereinafter fully described, illustrated in the accompanying drawings, and pointed out in the claims hereto appended.

Figure 1:
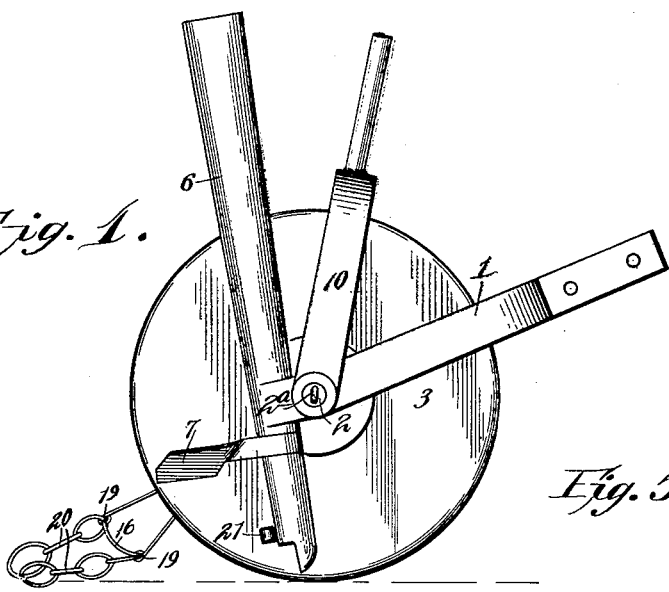
Figure 5:
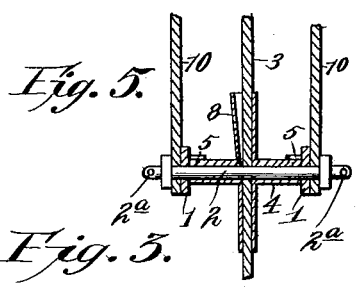
Figure 3:
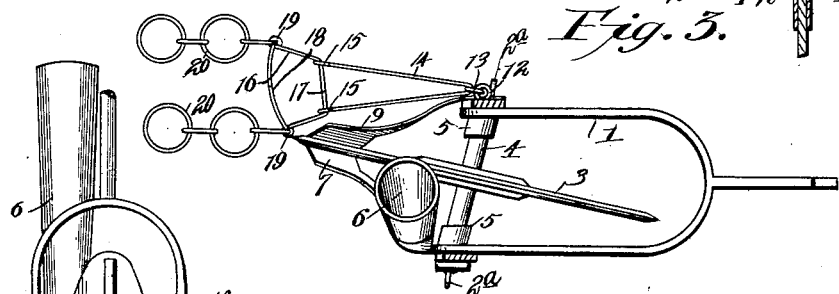
Figures 2, 4:
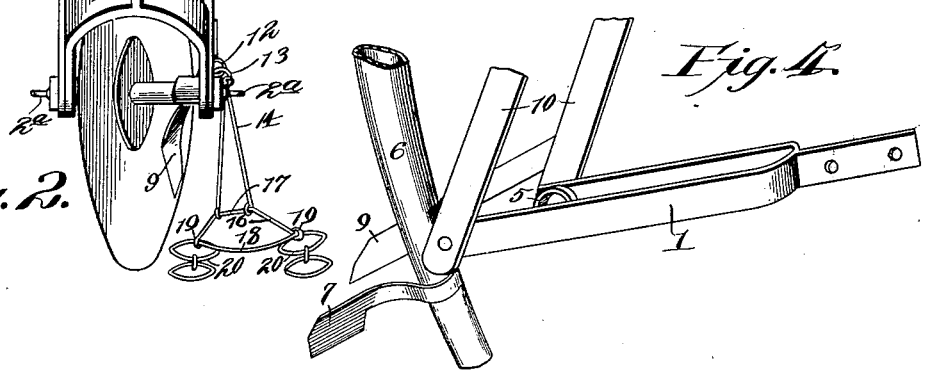

In the drawings, Figure 1 is an elevation of a seed-tube and a rotary colter or disk provided with my improvements. Fig. 2 is a front elevation. Fig. 3 is a plan view, partly in section. Fig. 4 is a detail perspective view of the standard, the seed-tube, and a portion of the fork. Fig. 5 is a detail sectional view illustrating the manner of mounting the rotary colter or disk. Fig. 6 is an elevation similar to Fig. 1, showing the seed-tube arranged at the front. Figs. 7 and 8 are plan views illustrating the manner of coupling the disks or colters.

Like numerals of reference designate corresponding parts in all the figures of the drawings.

1 designates a forked standard designed to be pivotally mounted on or connected with the supporting-frame of a grain-drill or planter and provided at opposite sides with bearings for the reception of a transverse spindle 2, upon which is mounted a rotary colter or disk 3, having hub extensions 4, interposed between the sides of the forked standard. One side of the forked standard is longer than the other, and the transverse shaft or spindle 2 is set at an angle, being arranged at an acute angle to the longer side of the fork of the standard and at an obtuse angle to the shorter side of the same. This arranges the rotary disk or colter at an angle to the line of movement of the machine and turns one of its faces partially to the front, thereby enabling it to open a pronounced furrow. The seed-tube, which is located at the back, as shown in Fig. 1, and front, as shown in Fig. 6, is protected by this arrangement and does not come in contact with obstructions, but is arranged in the furrow formed by the disk or colter. The grain-drill is designed to be provided with a series of rotary disks or colters, and their shafts, which are provided at their ends with eye $2^a$, will be coupled together in series, so that the disks or colters will be arranged in a zigzag line. The ends of the shafts or spindles 2 may be directly coupled together or they may be connected by a link or bar for spacing the disks or colters the desired distance apart, as hereinafter explained. The seed-tube, which is located at one side of the disk or colter, as clearly illustrated in Fig. 6 of the accompanying drawings, will be located at the opposite side of the adjacent colter. The sides of the forked standard are provided at their inner faces with curved flanges 5, extending inward over the ends of the hub extensions of the disk and forming guards or shields. The seed-tube 6, which is mounted upon one of the sides of the forked standard, extends downward to within a short distance of the periphery of the rotary colter or disk, and it carries a scraper-blade 7 when it is arranged at the back, as shown in Figs. 1 and 3. The scraper-blade, which extends rearward from the seed-tube, is disposed at a slight angle to the plane of the disk or colter, and its lower edge is arranged adjacent to the same to scrape therefrom any soil adhering thereto. The bearings of the rotary colter or disk are lubricated through an oil hole or passage 8, located at one side of the disk or colter and extending inward to the hub of the same.

The scraper 7 is arranged at one side of the disk or colter, and the opposite side is cleaned by a similarly-arranged scraper-blade 9, secured to a fork 10, straddling the disk or colter and connected with the shaft or spindle at the ends thereof. The sides of the fork are arranged outside the sides of the standard, and the upper end of the fork is designed to be connected with suitable operating mechanism for raising and lowering the colter or disk to press the same into the ground and to lift it therefrom. One side of the fork is provided with an eye 12, which receives an ordinary link 13, and the latter connects a V-shaped piece 14 to the device. The V-shaped piece or member is connected at its apex to the said link and is provided at the rear ends of its sides with eyes 15 for the reception of a loop or frame 16. The loop or frame 16 is provided with a transverse front portion 17 and a curved rear portion 18 and has eyes 19 at opposite sides for the reception of the front links of drag-chains 20, which are adapted to cover the furrow formed by the disk or colter. The seed-tube is also provided with an eye 21 to enable the drag-chains to be connected at that point, if desired.

In Fig. 6 of the accompanying drawings the seed-tube is shown in advance of the shaft of the disk or colter at the front portion of the latter, being mounted upon one side of the forked standard, and the scraper 23 is preferably mounted on one side of the forked standard 24, the other scraper being carried by the other side of the fork 27.

In Fig. 7 of the drawings the colters are shown coupled in a series by means of links or rods 25, provided with eyes and linked into eyes at the ends of the shafts. The disks or colters alternately converge and diverge, and the seed-tubes are alternately arranged at opposite sides of the disks or colters, the seed-tube, as shown in Fig. 7, being arranged at the right-hand side of the end disk or colter and at the left-hand side of the second disk or colter. In Fig. 8 of the drawings the shafts are shown coupled practically directly together; but the arrangement of the disks and seed-tubes is the same as that illustrated in Fig. 7 of the drawings. The front ends of the standards are illustrated in Figs. 7 and 8 as connected to the main axle 26 of the grain-drill or planter; but it will be readily apparent that they may be connected with the supporting-frame in any other suitable manner.

It will be seen that the improvements are adapted to be readily applied to an ordinary planter or grain-drill and that the scraper-blades, which are located at opposite sides of the colter or disk, are capable of readily removing any soil adhering to the same. Furthermore, it will be apparent that the connections between the drag-chains and the device are flexible and adapted to maintain the chains properly spaced apart.

Changes in the form, proportion, size, and the minor details of construction within the scope of the appended claims may be resorted to without departing from the spirit or sacrificing any of the advantages of this invention.

What is claimed is—

1. In a grain-drill, the combination of a forked standard provided with a rearwardly-extending scraper-blade, a shaft or spindle connecting the sides of the standard, a rotary colter or disk mounted on the shaft or spindle, a seed-tube connected with one side of the standard and located at one side of the disk or colter, a fork connected with the shaft or spindle, and a scraper-blade located at the other side of the colter or disk and carried by the fork, substantially as described.

2. The combination of a forked standard provided at the inner faces of its sides with curved flanges forming guards or shields, a shaft or spindle connecting the sides of the standards, a disk or colter mounted on the shaft or spindle and having hub extensions and provided at one side with an oil hole or passage communicating with the hub extensions, a seed-tube connected with one side of the standard, and a fork straddling the disk or colter and connected with the shaft or spindle, substantially as described.

3. In a device of the class described, a drag-chain comprising the V-shaped connecting-piece, the loop or frame hinged to the sides of the V-shaped connecting-piece and provided at opposite sides with eyes, and chains linked into the eyes, substantially as described.

4. In a device of the class described, the combination of a forked standard having one of its sides longer than the other, a transverse shaft or spindle journaled in suitable bearings at the ends of the sides of the forked standard and set at an angle, said shaft or spindle being disposed horizontally, a disk or colter mounted on the shaft or spindle and arranged at an angle to the line of movement of the device and having one of its faces partially turned to the front, and a seed-tube located at the opposite face of the disk or colter, substantially as described.

5. In a device of the class described, the combination of a series of forked standards each having one of its sides longer than the other, transverse shafts or spindles journaled in suitable bearings at the ends of the sides, the reversely-arranged disks or colters mounted on the shafts, seed-tubes, and means for coupling the shafts, substantially as described.

6. In a device of the class described, the combination of a series of forked standards each having one of its sides longer than the other, transverse shafts or spindles journaled in suitable bearings at the ends of the sides, the reversely-arranged disks or colters mounted on the shafts, seed-tubes, and links connecting the shafts, substantially as described.

In testimony that I claim the foregoing as my own I have hereto affixed my signature in the presence of two witnesses.

SIMON BELANGER.

Witnesses:
GREGOIRE DESJARLAIS,
THÉOPHILE PARÉ.